Aug. 22, 1961  J. B. MARTIN  2,997,492
METHOD FOR PREPARING FATTY ESTERS OF STRAIGHT CHAIN HEXITOLS
Filed Feb. 17, 1959
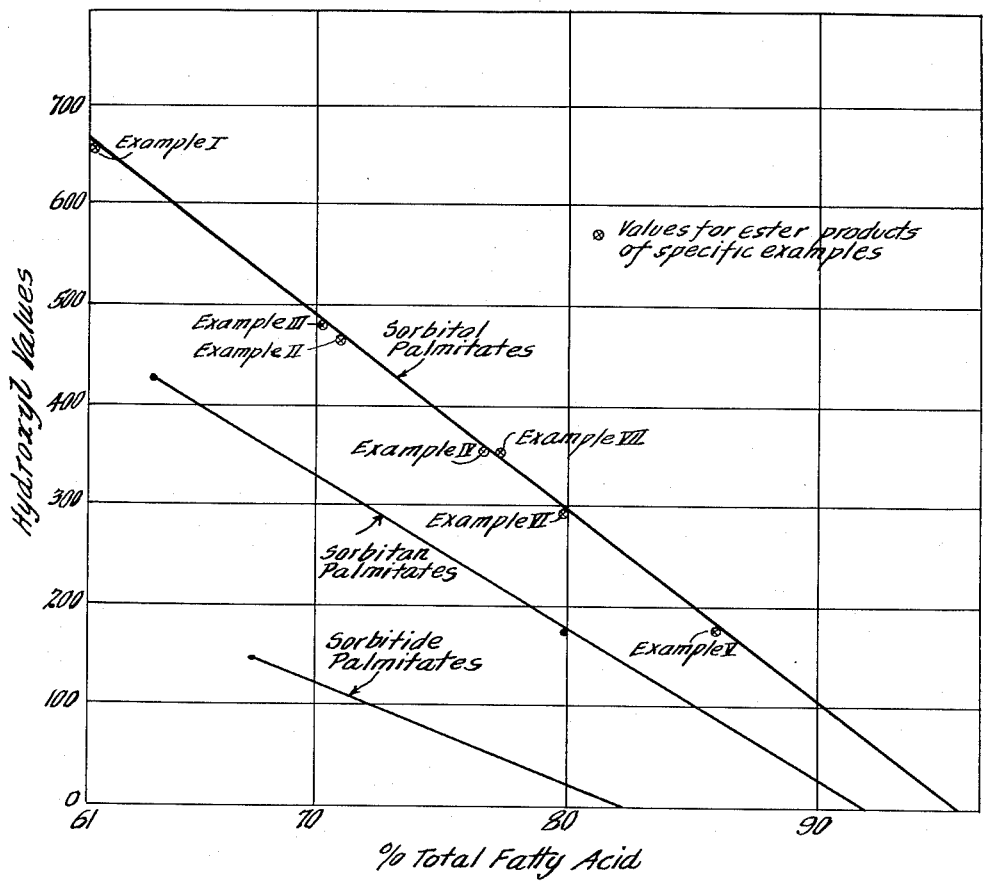
INVENTOR
James B. Martin,
BY Howard W. Brewer
ATTORNEY

2,997,492
METHOD FOR PREPARING FATTY ESTERS OF STRAIGHT CHAIN HEXITOLS

James Bruce Martin, Hamilton, Ohio, assignor to The Procter & Gamble Company, Cincinnati, Ohio, a corporation of Ohio
Filed Feb. 17, 1959, Ser. No. 793,820
11 Claims. (Cl. 260—410.6)

This invention relates to a process for preparing fatty esters of polyhydric alcohols.

More specifically this invention relates to the preparation of partial and complete fatty esters of polyhydric alcohols having 6 carbon atoms in linear molecular configuration, such as sorbitol and mannitol.

As a matter of convenience, the following discussion for the most part treats with sorbitol and mannitol and the derivatives thereof. It is to be understood, however, that the discussion is equally applicable in the case of all of the polyhydric alcohols (straight-chain hexitols) contemplated herein.

Many methods of preparing fatty esters of polyhydric alcohols are known and have been heretofore employed. Among these are: the direct esterification of the polyhydric alcohols with fatty acids; reaction of the polyhydric alcohols with fatty acid anhydrides; and the reaction of polyhydric alcohol with the fatty acid halides. Various disadvantages are identified with these previous processes, such as difficulties in separating the desired products from the reaction mixture, excessive temperatures necessary to promote the reaction with the attendant adverse effects upon the organic reactants, including thermal decomposition, charring, discoloration and the like. Most particularly, such processes promoted the dehydration of the polyhydric alcohol molecule to the anhydro or inner ether form.

The prior art identifies the products produced in accordance with the aforementioned processes as, for example, sorbitol and mannitol esters. However, the products of these processes are not in fact the true sorbitol or mannitol esters but are more correctly identified as sorbitan and mannitan esters, the "an" ending indicating the presence of the anhydro configuration in the ester molecule.

The partial fatty esters of the hexitols, the preparation of which is contemplated in this application, are readily applicable where emulsification problems require solution. For example, these esters may be utilized in insecticides, textile and industrial emulsions, dry-cleaning products and as constituents in detergent compositions. These esters are particularly applicable as emulsifiers in the preparation and formulation of various cosmetic and edible products because of their non-toxic character. For example, they may be used in the preparation of cakes, candy, chewing gum, licorice, peanut butter, various beverages, pharmaceutical products, and vitamin oils. Although the sorbitan- and mannitan-type esters, i.e. those esters containing anhydro groups, very probably have satisfactory emulsification powers, such esters, identified as they are with surface active agents, have not received Food and Drug Administration approval for use with edible products—the additive effect of a multiplicity of such agents which find their way into food products creating a serious doubt that they are suitable for such use. (See 17 Fed. Register 4453, No. 97, and Fed. Register, March 26, 1958, p. 2007.) Consequently, the preparation of partial esters of straight chain hexitols having substantially no anhydro groups present in the molecule is of considerable commercial significance. However, the formation of the true partial esters of sorbitol and mannitol, i.e. those esters containing no anhydro groups, has been accomplished prior to the present invention only through the use of cumbersome and commercially impractical methods.

Although the prime consideration of this invention is the provision of a method for preparing partial fatty esters of straight-chain hexitols which are substantially free of anhydro groups, it is to be appreciated that the process disclosed and claimed herein can also be utilized for preparing complete fatty esters of the hexitols.

With the foregoing considerations in mind it is an object of the present invention to provide a method whereby fatty esters of straight-chain hexitols can be prepared under reaction conditions which will not promote the formation of anhydro configurations in the ester molecule.

A further object of this invention is to provide a process for the preparation of fatty esters of straight-chain hexitols substantially free from molecular anhydro configurations which is commercially practical.

Other objects and advantages will be apparent from the following detailed descriptions.

It has been found that the foregoing objects can be accomplished by subjecting to interesterification a mixture of a straight-chain hexitol and a fatty acid ester of an aliphatic primary monohydroxy alcohol or a fatty acid ester of an aliphatic alcoholic polyhydroxy substance in the presence of pyridine.

Generally speaking, the invention contemplates reacting the straight-chain hexitol with the fatty acid ester in the presence of an alkaline catalyst which shows activity in interesterification reactions, at a temperature in the range from about 50° to about 150° C. and in the presence of pyridine. Following completion of the interesterification of the components to the desired degree, the catalyst is inactivated by the addition of water and/or acids such as acetic, phosphoric, citric, hydrochloric and the like, and the desired reaction products are freed of solvent and purified by any suitable means.

FIGURE I is a plot of hydroxyl value (H.V.) vs. percent total fatty acid (T.F.A.) for sorbitol and anhydrosorbitol palmitates based upon calculated values and shows the relationship of the analytically based H.V. vs. T.F.A. values for the ester products of the specific examples to the calculated values.

The term "straight-chain hexitol" as used herein refers to those polyhydric alcohols having 6 carbon atoms in linear molecular configuration. Examples of the hexitols contemplated are sorbitol, mannitol, dulcitol, iditol, talitol and allitol.

The fatty esters which can be employed in the reaction are the fatty acid esters of primary aliphatic monohydroxy alcohols having from 1 to 16 carbon atoms, for example, methanol, ethanol, hexanol, octanol, dodecanol, and hexadecanol specific examples being methyl palmitate, dodecyl palmitate and hexadecyl palmitate. In addition, fatty acid esters of completely or incompletely esterified polyhydric alcohols, such as glycol, glycerol, erythritol and pentaerythritol can be employed. Glycol dipalmitate, glycerol mono-, di-, and tripalmitate, erythritol tetrapalmitate and pentaerythritol tetrapalmitate are examples of such fatty esters. The use of fatty esters of the straight-chain hexitols is also contemplated. For example, the reaction of sorbitol hexapalmitate with sorbitol can be carried out in accordance with the present invention.

The aforementioned completely or incompletely esterified polyhydric alcohols and straight-chain hexitols will for purposes herein be referred to as aliphatic, alcoholic polyhydroxy substances.

The length of the fatty acid chain of the esters which can be employed in the reaction of this invention is not critical and is dictated primarily by the type of fatty acid material source available. As a general proposition, however, it has been found that fatty acids containing from about 8 to about 22 carbon atoms in the alkyl chain are most useful. Therefore, the mixtures of fatty acids obtained from animal, vegetable and marine oils and fats, such as coconut oil, cotton seed oil, soybean oil, tallow, lard, herring oil, sardine oil and the like represent readily available sources of fatty acid radicals. In the event it is desired to produce straight-chain hexitol esters of single fatty acids by this invention, then the individual fatty acid esters of the relatively volatile alcohols (e.g. methanol and ethanol), having from about 12 to about 22 carbon atoms in the fatty acyl chain can advantageously be reacted with the polyhydric alcohol with the aid of the particular reaction medium herein disclosed.

Of the fatty acid esters which may be used in the practice of this invention the esters of those alcohols having not more than 3 carbon atoms are preferred. Of this group the fatty glycerides are particularly advantageous.

The choice of solvent is essential to the realization of the interesterification of the straight-chain hexitol and the fatty ester under the conditions hereinbefore set forth. It has been found that pyridine is eminently suitable as the solvent in the present process.

The proportion of pyridine used is not critical and the reaction is successfully carried out so long as there is sufficient pyridine present to dissolve the straight-chain hexitol. Normally, the amount of pyridine can be varied from about 0.2 to about 50 times by weight of the straight-chain hexitol which is employed for reaction with the fatty acid ester. It is also to be understood that the solvent usage can be adjusted according to the particular reactants which are to be interesterified, precautions being taken, however, to assure a homogeneous system during the interesterification reaction.

The proportion of reactants is also not critical and is dictated primarily by the ultimate product which is desired. For example, in the reaction of sorbitol with a fatty ester, a proportion of these reactants can be chosen so that from one to essentially all of the hydrogen atoms of the hydroxyl groups of the sorbitol can be replaced by fatty acyl radicals. Or, where sorbitol and a triglyceride are being reacted, proportions can be chosen so that the final product may predominate in either glycerides or in sorbitol esters. As a practical matter, however, it has been found that molar ratios of straight-chain hexitol to fatty esters in the range from about 2:1 to 1:6 are most satisfactory, the proportions of the reactants being variable within the range depending upon the completeness of replacement desired and upon the number of fatty acid radicals in each mole of ester substance.

Although the process of the invention is illustrated herein with the use of sodium methoxide as the catalyst, effective practice of the process is not dependent upon the use of any particular catalyst. Rather, any alkaline molecular rearrangement of interesterification catalyst which will promote the interchange of radicals among the reactants of the process is suitable. Examples of usable catalysts are: sodium methoxide, sodium hydroxide, metallic sodium, sodium potassium alloy and quaternary ammonium bases such as trimethyl benzyl ammonium hydroxide. A discussion of other catalysts which are active in interesterification reactions may be found in U.S. Letters Patent 2,442,532 to E. W. Eckey, column 24, line 18 et seq.

The sodium methoxide catalyst may be advantageously used in the present invention in amounts from about 0.1 to about 2.0% by weight of the fatty ester which is to be reacted with the straight-chain hexitol. Equimolar amounts of other catalysts are, of course, also usable. The choice of catalyst and the amount which is to be used are dependent upon the particular constituents which are to be reacted.

In the practice of this invention, it was observed that the reaction rate for a given solvent usage and a given catalyst increased with an increase in temperature. With optimum amounts of pyridine and with sodium methoxide as the catalyst, at a temperature of 100° C. it was found that equilibrium was reached in about one hour's time. Where lower temperatures, such as 50° C., are employed, a longer time is necessary to achieve desired ester formation. Temperatures above 100° C. and up to the boiling point of pyridine (about 115° C.) may be employed if desired. It is also possible to employ temperatures in excess of the boiling point of pyridine providing that the reaction system is maintained under positive pressure to prevent the loss of the solvent. Generally speaking, with any of the aforementioned reactants or catalysts and within the ranges of proportions set forth the process of the invention is preferably carried out at temperatures in the range from about 90° C. to about 115° C.

Although the process of this invention is normally carried out at atmospheric pressure it can be carried out at reduced pressure, an operation which at times is decidedly advantageous. Or, the process can be carried out at atmospheric pressure and at a temperature which promotes slow distillation of pyridine from the reacting mixture while the interesterification reaction is progressing. For example, when a fatty acid ester of methanol is reacted with sorbitol, operation under reduced pressure such as about 300 mm. of mercury enables the methanol formed as a result of the interesterification to be removed from the reaction zone substantially as rapidly as it is liberated. This promotes a substantially complete conversion of the methyl ester to sorbitol fatty ester.

Under the foregoing conditions it has been found that the interesterification reaction may reach equilibrium in from about as little as one hour up to about five hours, the reaction being accelerated by an increase in the amount of catalyst used or an increase in temperature. No adverse effects have been noted if the reactants are allowed to remain in contact under interesterification conditions for considerable length of time, e.g. several hours, after the interesterification reaction is substantially complete. From a practical standpoint, however, little advantage is gained from such practice.

Since the reaction of the present invention is an interesterification in which sorbital for example is reacted with a fatty ester the resulting product of the reaction will constitute an equilibrium mixture of sorbitol, esters thereof, displaced alcoholic substance from the ester originally employed, and ester of such alcoholic substance. Thus, if triglycerides are reacted with the sorbitol then the product of the reaction will contain mono- and diglycerides as well as sorbitol esters. If it is desired to obtain sorbitol esters which are not so contaminated with original esters and derivatives thereof, then it is preferable to react volatile alcohol esters such as methyl or ethyl esters with the sorbitol and to conduct the reaction under reduced pressure so that displaced alcohol is distilled off. Yields of sorbitol esters of high purity are obtainable in this way since unreacted volatile esters can be separated subsequently by distillation or crystallization procedures.

The following examples will illustrate the manner in which the invention can be practiced but it is to be understood that the specific conditions set forth in these examples are not to be considered limiting of the invention which is defined only by the scope of the appended claims. In the examples all parts are expressed by weight.

*Example I*

36.4 parts of sorbitol, 27.0 parts of methyl palmitate, and 300 parts of pyridine were introduced into a reaction vessel provided with mechanical stirring means. To this mixture was added about 10 parts of a suspension of about 9% sodium methoxide catalyst in xylene. The resulting mixture was heated to 100° C. and agitated at that temperature for 1 hour. The catalyst was then inactivated by the addition of 1 to 2 parts of parts of glacial acetic acid and the pyridine was removed from the reaction mixture by vacuum distillation. The distillation residue was suspended in ether, was waterwashed four times while in suspension and the product was separated by filtration. 7.4 parts of ester was isolated.

From a comparison of calculated values with those obtained from an analysis of the product it was concluded that the product was essentially sorbitol monopalmitate. The substantial agreement between the calculated and analytical hydroxyl values is indicative of the substantially complete absence of anhydro groups in the product.

|  | Calculated, percent | Analytical, percent |
|---|---|---|
| Total Fatty Acid | 61.0 | 61.2 |
| Hydroxyl Value | 667 | 661 |
| Acid Value | 0 | 0 |

Example II 9 parts of sorbitol, 13.5 parts of methyl palmitate and about 100 parts of pyridine were introduced into a reaction vessel provided with mechanical stirring means. This mixture was heated to about 115° C. and then about 1% by weight of the methyl palmitate of a suspension of about 9% sodium methoxide catalyst in xylene was added to the heated mixture. The resulting mixture was reacted for four hours under atmospheric pressure. The temperature of the mixture during the reaction was allowed to rise from 115° C. to 150° C. to provide slow distillation of the pyridine from the reacting mixture. After four hours the catalyst was inactivated by the addition of a 50% aqueous solution of acetic acid.

The reaction product was then taken up in a 1:4 mixture of butanol and ethyl acetate solution and was waterwashed four times after which the butanol-ethyl acetate mixture was removed from the product by evaporation under vacuum. The resultant product was crystallized from about 20 parts by weight of a 1:1 mixture of dioxane and ethyl ether at 10° C. and vacuum dried for 18 hours at 70°–80° C.

The ester product was found by analysis to have an acid value of 4.1, a total fatty acid content of 71.1% and a hydroxyl value of 467.8. The analytical hydroxyl value of 467.8 compares favorably with the calculated hydroxyl value for the product of 471 indicating the substantially complete absence of anhydro groups in the product.

Example III

The process of Example II was repeated using 9 parts of mannitol as the straight-chain hexitol reactant. The reaction conditions were the same as in Example II except that the temperature of the reacting mixture rose to 120° C. only.

By analysis, the ester product had the following characteristics:

Acid value _____ 2.1
Total fatty acid _____percent__ 70.5
Hydroxyl value _____ 480.4

The hydroxyl value of 480.4 when compared with the calculated hydroxyl value for this product (483) indicates the substantially complete absence of anhydro groups in the product.

Example IV

The process of Example III was repeated except that 27 parts of methyl palmitate was reacted with the 9 parts of mannitol. About 100 parts of pyridine was used as the solvent.

The ester product of this process had an acid value of 1.7 a total fatty acid content of 76.8% and a hydroxyl value of 358.3 by analysis (the calculated hydroxyl value for comparison purposes was 360).

Example V 18.2 parts of sorbitol, 89 parts of a mixture of 80% soybean oil and 20% cottonseed oil hydrogenated to an iodine value of about 76 and about 200 parts of pyridine were introduced into a reaction vessel provided with mechanical stirring means. This mixture was heated to a temperature of 100° C. and then 1% of sodium methoxide catalyst, by weight of the fatty material, was added to the heated mixture. (The sodium methoxide was added as a 9% suspension in xylene.) The resulting mixture, while being agitated, was allowed to react for two hours at 100° C. under atmospheric pressure. The catalyst was then inactivated by the addition to the reacting mixture of a 50% aqueous solution of acetic acid. The resulting mixture was then taken up in a 1:4 mixture of butanol and ethyl acetate, washed four times with water and three times with aliquots of 10% aqueous hydrochloric acid solution. The butanol-ethyl acetate solvent was removed from the washed mixture by evaporation over a water bath.

The ester product was found to have a total fatty acid content of 86.1% and a hydroxyl value of 178.4.

Example VI

The process of Example V was repeated except that 45 parts of the soybean oil-cottonseed oil mixture was reacted with 18.2 parts of sorbitol.

The resulting product, by analysis, had a total fatty acid content of 80.0% and a hydroxyl value of 293.7.

Example VII

The process of Example VI was repeated except that the reaction between the sorbitol and the soybean oil-cottonseed oil mixture was allowed to proceed for four hours.

The resultant ester product, by analysis, was found to have a total fatty acid content of 77.4% and a hydroxyl value of 355.4.

In the foregoing examples the hydroxyl values (H.V.) and percent total fatty acids (T.F.A.) of the products were determined analytically in accordance with Official Method CD4-40 and Tentative Method G3-53 respectively of the Official and Tentative Methods of the American Oil Chemists Society.

Yields of crystalline sorbitol and mannitol esters obtained in accordance with the processes of the examples were found, for the most part, to be in the range of about 60% as determined from the equation:

Ester yield=

$$\frac{\text{weight of product} \times \text{T.F.A. of product}}{\text{weight of ester reactant} \times \text{T.F.A. of reactant}} \times 100$$

Wherever set forth herein the calculated hydroxyl values of the sorbitol and mannitol fatty esters were obtained using the following equations:

(a) For sorbitol and mannitol palmitates—

$$\text{H.V.} = 1851 - \frac{1851}{95.4} \times \text{T.F.A. (observed)}$$

where

1851=H.V. of sorbitol or mannitol, and
95.4=T.F.A. of sorbitol or mannitol hexapalmitate ester (b) For ester products from the reaction of sorbitol or mannitol with the soybean oil-cottonseed oil admixture—

$$\text{H.V.} = 1851 - \frac{1851}{95.75} \times \text{T.F.A. (observed)}$$

where

1851=H.V. of sorbitol or mannitol
95.75=T.F.A. of sorbitol or mannitol completely esterified with the soybean oil-cottonseed oil admixture That the ester products produced in accordance with the process of this invention are substantially completely free from undesirable anhydro groups is evident from FIGURE I. This figure contains a plot of hydroxyl value (H.V.) versus percent total fatty acid (T.F.A.) and shows the linear relationship between these values. The three drawn curves of FIGURE I are based upon the following calculated values for sorbitol palmitates (sorbitol-fatty esters containing no anhydro groups), sorbitan palmitates (monoanhydrosorbitol-fatty esters) and sorbitide palmitates (dianhydrosorbitol-fatty esters).

| Compound | H.V. | T.F.A. |
|---|---|---|
| Sorbitol Monopalmitate | 668 | 61.0 |
| Sorbitol Dipalmitate | 342 | 77.8 |
| Sorbitol Hexapalmitate | 0 | 95.4 |
| Sorbitan Monopalmitate | 429 | 63.7 |
| Sorbitan Dipalmitate | 175 | 80.0 |
| Sorbitan Tetrapalmitate | 0 | 91.7 |
| Sorbitide Monopalmitate | 145 | 66.7 |
| Sorbitide Dipalmitate | 0 | 82.3 |

The hydroxyl values of the products of each of the specific examples herein have been indicated on FIGURE I and have been numbered to conform with the respective examples.

In FIGURE I the curve delineated by the calculated values for the products obtained from the interesterification of sorbitol or mannitol with the soybean oil-cottonseed oil mixture has not been indicated. Based upon calculated points represented by an H.V. of 629 and T.F.A. of 63.2 for the mono-ester of sorbitol and the soybean oil-cottonseed oil mixture and an H.V. of 0 and a T.F.A. of 95.75 for the hexa-ester of sorbitol and the oil mixture and being a straight line relationship, this curve was found to so closely approximate the sorbitol palmitates curve of FIGURE I that the latter curve was utilized as a comparison reference for the products of Examples V, VI and VII.

The excellent agreement between the analytically obtained values of the products of the examples and the curve representing the calculated values for anhydro-free sorbitol-fatty esters is readily apparent.

It is to be understood that in the foregoing examples the sorbitol and mannitol may be replaced with other straight-chain hexitols hereinbefore mentioned with comparable results. Similarly, other fatty esters of the character indicated hereinbefore may be substituted for the fatty ester reactants of the examples.

Having thus described the invention what is claimed is:

1. A process for preparing fatty esters of straight-chain hexitols, comprising reacting the straight-chain hexitol with a fatty acid ester selected from the group consisting of fatty acid esters of aliphatic primary monohydroxy alcohols having from 1 to about 16 carbon atoms and fatty acid esters of aliphatic alcoholic polyhydroxy substances, in the presence of an interesterification catalyst, at a temperature in the range from about 90° C. to about 115° C. and in the presence of pyridine, inactivating the catalyst, distilling substantially all of the pyridine from the reaction mixture, taking up the residue in a solvent and water washing the resultant solution, whereby fatty esters of straight chain hexitols which are substantially free from anhydro groups are obtained.

2. The process of claim 1 wherein the straight-chain hexitol is sorbitol.

3. The process of claim 1 wherein the straight-chain hexitol is mannitol.

4. The process of claim 1 wherein the straight-chain hexitol is dulcitol.

5. A process for preparing fatty esters of straight-chain hexitols, comprising reacting the straight-chain hexitol with a fatty acid ester selected from the group consisting of fatty acid ester of aliphatic primary monohydroxy alcohols and fatty acid esters of aliphatic alcoholic polyhydroxy substances, all of which alcoholic substances have no more than 3 carbon atoms, in the presence of an interesterification catalyst, at a temperature in the range from about 90° to about 115° C. and in the presence of pyridine, inactivating the catalyst, distilling substantially all of the pyridine from the reaction mixture, taking up the residue in a solvent and water washing the resultant solution, whereby fatty esters of straight chain hexitols substantially free from anhydro groups are obtained.

6. A process for preparing fatty esters of straight-chain hexitols, comprising reacting the straight-chain hexitol with a fatty acid ester of glycerol, in the presence of from about 0.1 to about 2% of an interesterification catalyst by weight of the glycerol ester, at a temperature in the range from about 90° to about 115° C. in a reaction medium comprising essentially pyridine, inactivating the catalyst, distilling substantially all of the pyridine from the reaction mixture, taking up the residue in a solvent and water washing the resultant solution, whereby fatty esters of straight-chain hexitols which are substantially free from anhydro groups are obtained.

7. The process of claim 6 wherein the straight-chain hexitol is sorbitol.

8. The process of claim 6 wherein the straight-chain hexitol is mannitol.

9. A process for preparing fatty esters of straight-chain hexitols, comprising reacting the straight-chain hexitol with a fatty triglyceride in the presence of from about 0.1 to about 2% of an interesterification catalyst at a temperature of about 100° C. in a reaction medium comprising essentially pyridine, inactivating the catalyst by acidulation, distilling substantially all of the pyridine from the reaction mixture, taking up the residue in a solvent and water-washing the resultant solution, whereby fatty esters of straight-chain hexitols which are substantially free from anhydro groups are obtained.

10. The process of claim 9 wherein the straight-chain hexitol is sorbitol.

11. The process of claim 9 wherein the straight-chain hexitol is mannitol.

References Cited in the file of this patent

UNITED STATES PATENTS

| | | |
|---|---|---|
| 2,223,558 | Epstein | Dec. 3, 1940 |
| 2,305,228 | Woodhouse et al. | Dec. 15, 1942 |
| 2,357,078 | Brown | Aug. 29, 1944 |
| 2,390,528 | Freeman | Dec. 11, 1945 |
| 2,442,534 | Eckey | June 1, 1948 |
| 2,634,278 | Kuhrt | Apr. 7, 1953 |